(12) United States Patent
Damle et al.

(10) Patent No.: US 9,501,405 B2
(45) Date of Patent: *Nov. 22, 2016

(54) FLEXIBLE WEAR MANAGEMENT FOR NON-VOLATILE MEMORY

(71) Applicant: Intel Corporation, Santa Clara, CA (US)

(72) Inventors: Prashant S. Damle, Portland, OR (US); Robert W. Faber, Hillsboro, OR (US); Ningde Xie, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,195

(22) Filed: May 6, 2015

(65) Prior Publication Data

US 2015/0309926 A1    Oct. 29, 2015

Related U.S. Application Data

(63) Continuation of application No. 13/682,885, filed on Nov. 21, 2012, now Pat. No. 9,032,137.

(51) Int. Cl.
*G06F 12/00* (2006.01)
*G06F 12/02* (2006.01)

(52) U.S. Cl.
CPC ... *G06F 12/0246* (2013.01); *G06F 2212/7211* (2013.01)

(58) Field of Classification Search
CPC ............. G06F 12/0246; G06F 3/0679; G06F 2212/7211
USPC .......................................... 711/103, 165, 170
See application file for complete search history.

(56) References Cited

U.S. PATENT DOCUMENTS

| 6,985,992 | B1 | 1/2006 | Chang et al. |
| 8,130,553 | B2 | 3/2012 | Buch et al. |
| 8,296,539 | B2 | 10/2012 | Chen et al. |
| 2005/0235131 | A1 | 10/2005 | Ware |
| 2006/0149891 | A1 | 7/2006 | Rudelic |

FOREIGN PATENT DOCUMENTS

KR    10-2010-0013485 A    2/2010

OTHER PUBLICATIONS

International Search Report and Written Opinion received for Patent Application No. PCT/US2013/045616, mailed on Sep. 27, 2013, 11 pages.

*Primary Examiner* — Jasmine Song
(74) *Attorney, Agent, or Firm* — Chapin Intellectual Property Law, LLC

(57) ABSTRACT

Systems and methods of memory cell wear management that can achieve a more uniform distribution of write cycles across a memory cell address space. The systems and methods allow physical addresses of memory cells subjected to a high number of write cycles to be swapped with physical addresses of memory cells subjected to a lower number of write cycles. The physical address of a group of memory cells is a "hot address" if the write cycle count for that memory cell group exceeds a specified threshold. If the write cycle count for a group of memory cells does not exceed the specified threshold, then the physical address of that memory cell group is a "cold address". The systems and methods allow the specified threshold of write cycle counts to be dynamically incremented to assure that cold addresses are available for swapping with hot addresses in the memory cell address space.

25 Claims, 5 Drawing Sheets

FLEXIBLE WEAR MANAGEMENT FOR NON-VOLATILE MEMORY

CROSS REFERENCE TO RELATED APPLICATIONS

This application is a continuation of U.S. patent application Ser. No. 13/682,885 filed Nov. 21, 2012 entitled FLEXIBLE WEAR MANAGEMENT FOR NON-VOLATILE MEMORY.

BACKGROUND

A computerized device can include a non-volatile storage medium for storing information that can survive after power is removed from the computerized device. Such a computerized device can be a smartphone, a tablet, or a laptop computer, and can include at least one processor and a solid-state disk (SSD). The SSD provides non-volatile storage for the computerized device, and the processor can employ the SSD to store digital information (e.g., data, computer-executable instructions, applications) for a user of the computerized device. Because the digital information is stored in the non-volatile storage of the SSD, the digital information can persist in the computerized device, even if power is lost to the computerized device. After power is restored to the computerized device, the processor can retrieve the digital information from the SSD.

An SSD typically includes a non-volatile storage medium (e.g., NAND flash memory, NOR flash memory) that stores digital information in an array of memory cells. Such memory cells can have a finite endurance of several tens or hundreds of thousands, or even up to one or more millions, of write cycles (e.g., cycles of erase/write operations). If any of the memory cells in the non-volatile storage medium are subjected to a number of write cycles that exceeds their endurance capabilities, then those memory cells may wear out and eventually lose their functionality. For example, the memory cells may lose data, or may lose their ability to store data. In an effort to assure that no memory cells become worn out over the expected lifetime of the computerized device in which they are employed, the computerized device may employ wear management technology such as "wear leveling", which is generally designed to achieve a uniform distribution of erase/write operations across an address space of the memory cells. In this way, premature failure of memory cells due to high concentrations of write cycles within the memory cell address space can be reduced.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1:
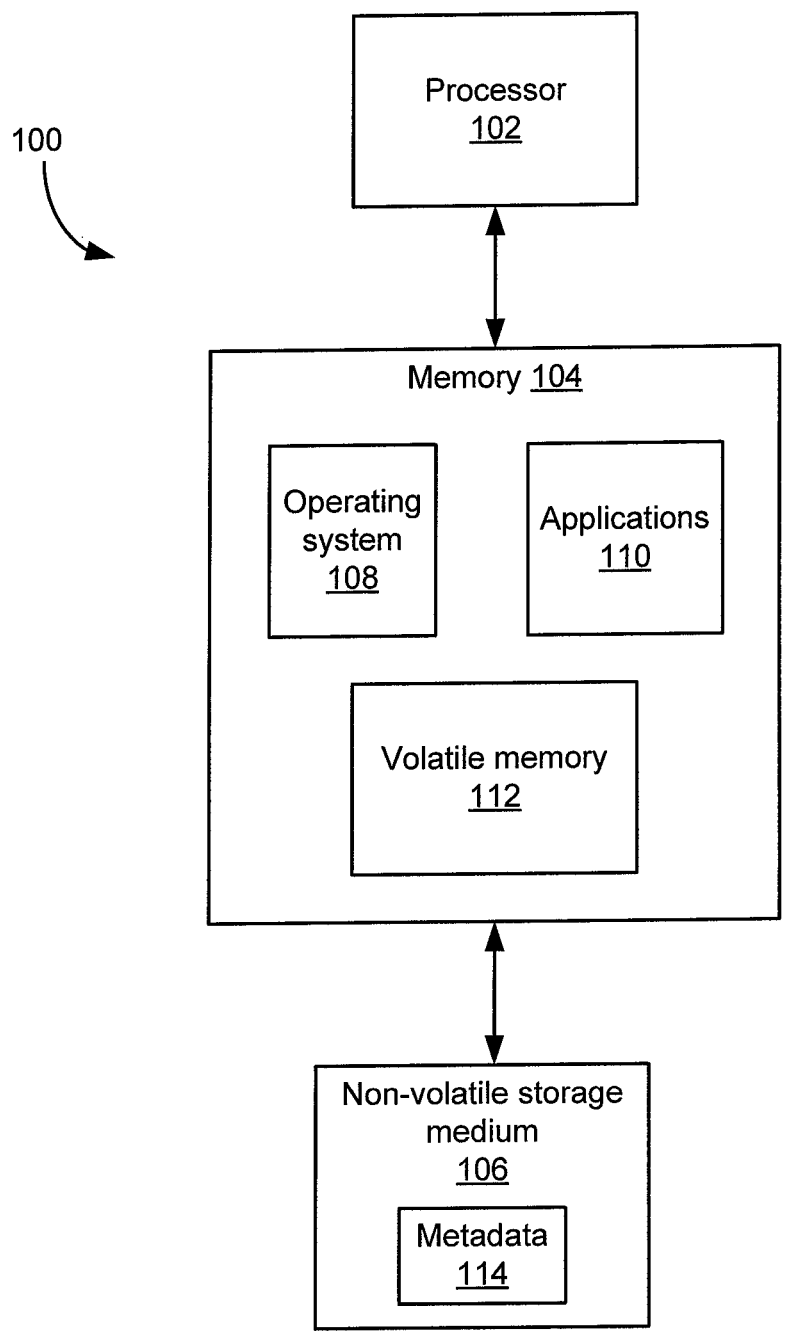
FIG. 1 illustrates a block diagram of a computer system that can be configured to implement memory cell wear management, in accordance with the present application.

The following detailed description refers to the accompanying drawings. The same reference numbers in different drawings may identify the same or similar elements. Also, the following detailed description does not limit the invention.

Systems and methods of memory cell wear management are disclosed that can be employed in computerized devices to achieve a more uniform distribution of write cycles across a memory cell address space. The disclosed systems and methods allow the physical addresses of memory cells that have been subjected to a high number of write cycles (e.g., cycles of erase/write operations) to be exchanged or "swapped" with the physical addresses of memory cells that have been subjected to a lower number of write cycles. The physical address of a group of memory cells is referred to herein as a "hot address" if the number of write cycles (also referred to herein as the "write cycle count") for that group of memory cells exceeds a specified threshold. If the write cycle count for a group of memory cells does not exceed the specified threshold, then the physical address of that group of memory cells is referred to herein as a "cold address".

In one aspect, if a physical address determined to be a hot address in a memory cell address space is swapped with another physical address in the memory cell address space that transitions from being a cold address to a hot address, based on the specified threshold of write cycle counts, then the disclosed systems and methods allow that pair of physical addresses to be "unswapped", i.e., the respective physical addresses are allowed to revert to their memory assignments prior to being swapped. In another aspect, the disclosed systems and methods allow the specified threshold of write cycle counts to be dynamically incremented in response to a predetermined event to assure that one or more cold addresses will be available for swapping with physical addresses determined to be hot addresses in the memory cell address space.

In a further aspect, when the physical address of a group of memory cells to be written to is determined to be a hot address, the disclosed systems and methods can randomly generate another physical address, and, if that new physical address is determined to be a cold address, then the disclosed systems and methods can allow that hot address to be swapped with the randomly generated cold address. Otherwise, if a predetermined percentage of attempts to randomly generate a cold address are unsuccessful, i.e., each such attempt to randomly generate a cold address results in the generation of another hot address, then the disclosed systems and methods can dynamically increment the specified threshold of write cycle counts by a predetermined amount, thereby increasing the number of physical addresses in the memory cell address space that may be determined to be cold addresses. For example, if 95% of such attempts to randomly generate a cold address are unsuccessful, then it can be assumed that the majority of the physical addresses in the memory cell address space are hot addresses, and therefore the specified threshold of write cycle counts can be incremented to increase the number of physical addresses that may subsequently be determined to be cold addresses.

One drawback of non-volatile storage media that employ conventional wear management technology such as wear leveling is that the desired uniform distribution of erase/write operations across the memory cell address space may not always be achievable. This may particularly be the case for non-uniform workloads, in which one portion of the memory cell address space may be written to with high probability, while another portion of the memory cell address space may be written to with a lower probability. Moreover, wear leveling may not be the most favorable wear management technology to use in non-volatile storage media that employ "write-in-place" data handling techniques, which allow data accessed from a particular memory cell address to be modified and then put back in the same memory cell locations.

By providing systems and methods of memory cell wear management that allow physical addresses determined to be hot addresses in a memory cell address space to be swapped with other physical addresses determined to be cold addresses in the memory cell address space, based on a dynamically incrementing threshold of write cycle counts, a more uniform distribution of write cycles across the memory cell address space may be achieved. Moreover, by allowing a previously swapped pair of physical addresses in the memory cell address space to be unswapped if that pair of physical addresses both become hot addresses, the percentage of swapped physical addresses in the memory cell address space may be reduced, thereby making the disclosed systems and methods more favorable to use with non-volatile storage media that employ "write-in-place" data handling techniques. For example, such unswapping of previously swapped pairs of physical addresses, when both physical addresses in the respective pairs become hot addresses, may assure that no more than about 20% of the physical addresses in the memory cell address space are in a swapped state at a particular time.

FIG. 1 illustrates a computer system 100 that can be configured to implement memory cell wear management in volatile or non-volatile memory, in accordance with the present application. As shown in FIG. 1, the computer system 100 includes at least one processor 102, at least one memory 104, and a non-volatile storage medium 106, such as a solid-state disk (SSD). The processor 102 is operative to execute instructions stored on at least one non-transitory storage medium, such as the memory 104 or any other suitable storage medium, for performing various processes within the computer system 100, including one or more processes for controlling operations of the memory 104 and/or the non-volatile storage medium 106. The memory 104 can include one or more memory components such as a volatile memory 112, which may be implemented as a dynamic random access memory (DRAM), or any other suitable volatile memory. It is noted that digital information (e.g., data, computer-executable instructions, applications) stored in the volatile memory 112 may be lost after power is removed from the computer system 100. The memory 104 can also be configured to store an operating system 108 executable by the processor 102, and one or more applications 110 that may be run by the operating system 108. In response to a request generated by one of the applications 110, the processor 102 can execute the operating system 108 to perform data erase/write/read operations on the volatile memory 112 and/or the non-volatile storage medium 106. The non-volatile storage medium 106 is configured to include a non-volatile memory, which can store digital information that can persist even if power is lost to the computer system 100. For example, the non-volatile memory may be implemented as NAND or NOR flash memory that uses a single bit per memory cell, multi-level cell (MLC) memory, for example, NAND flash memory with two bits per cell, polymer memory, phase-change memory (PCM), stacked PCM cell arrays that use phase-change memory and switch (PCMS) technology, nanowire-based charge-trapping memory, ferroelectric transistor random access memory (FeTRAM), 3-dimensional cross-point memory, or any other suitable non-volatile memory. After power is restored to the computer system 100, the processor 102 can retrieve the digital information from the non-volatile memory of the non-volatile storage medium 106.

It is noted that FIG. 1 illustrates an exemplary embodiment of the computer system 100, and that other embodiments of the computer system 100 may include more apparatus components, or fewer apparatus components, than the apparatus components illustrated in FIG. 1. Further, the apparatus components may be arranged differently than as illustrated in FIG. 1. For example, in some embodiments, the non-volatile storage medium 106 may be located at a remote site accessible to the computer system 100 via the Internet, or any other suitable network. In addition, functions performed by various apparatus components contained in other embodiments of the computer system 100 may be distributed among the respective components differently than as described herein.

In some embodiments, data written to and/or read from the non-volatile memory of the non-volatile storage medium 106 may be structured in blocks. Further, bits (e.g., 1 or 0) representing digital information may be stored in the non-volatile memory of the non-volatile storage medium 106 in memory cells, which, in turn, may be organized into pages, or any other suitable portions or chunks of the non-volatile memory. For example, the size of a page may be 2,048 bytes, or any other suitable number of bytes. When data erase/write operations are to be performed on a specified page, that page may first be placed into an erase block, which can contain a plurality of pages, such as 64 pages, or any other suitable number of pages. Further, any data stored on the pages in the erase block may be temporarily stored in the volatile memory 112, and the entire erase block may then be erased, resulting in all of the pages in the erase block becoming blank pages. Next, new data may be written to the specified page, and the data temporarily stored in the volatile memory 112 may be rewritten to the remaining pages in the erase block, thereby completing a single write cycle (e.g., a single cycle of erase/write operations) in the non-volatile memory of the non-volatile storage medium 106.

Figure 2:
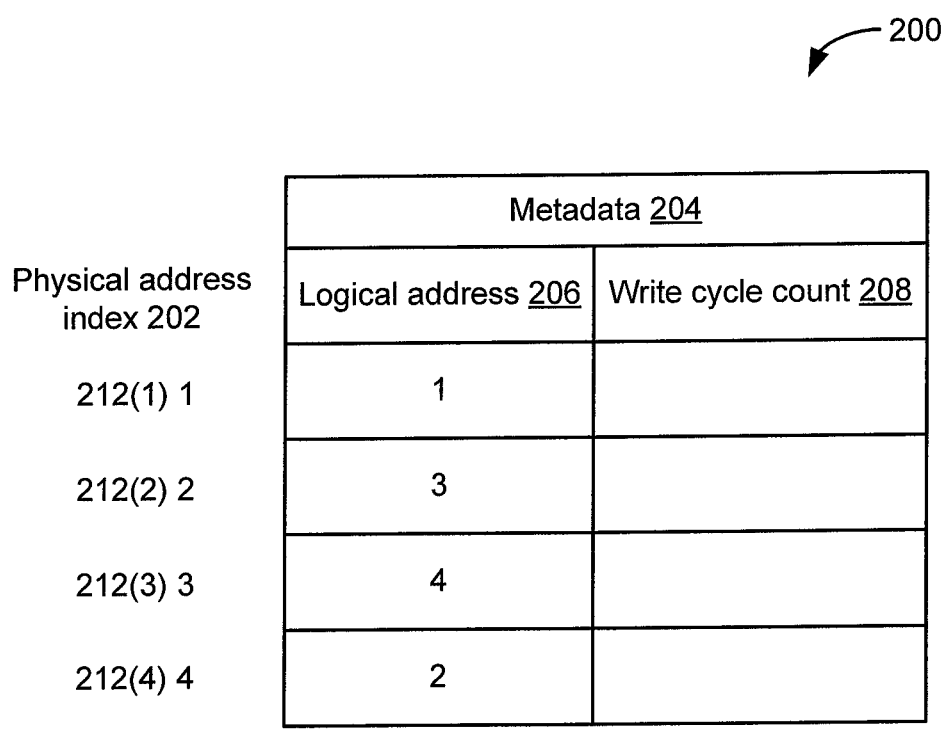
FIG. 2 illustrates a diagram of metadata that can be included in a non-volatile storage medium within the computer system of FIG. 1.

FIG. 2 illustrates a table 200 of metadata information 114 that can be stored in the non-volatile memory of the non-volatile storage medium 106. For example, the metadata information 114 may correspond to metadata for a plurality of pages, or any other suitable portions or chunks of memory, in at least one erase block of the non-volatile memory. In some embodiments, such page metadata may be stored in the volatile memory 112. As shown in FIG. 2, the table 200 includes a physical address index 202, which indexes the physical addresses of the respective pages. As employed herein, the term "index" refers to a pointer which points to a physical address of a particular page in the non-volatile memory where data can be erased/written.

The table 200 further includes a field 204 for storing the page metadata, which, in turn, includes a logical address field 206 and a write cycle count field 208. The logical address field 208 includes logical addresses (e.g., logical addresses 1, 3, 4, 2) that the processor 102 can refer to when performing data erase/write/read operations on the pages located at corresponding physical addresses of the non-volatile memory of the non-volatile storage medium 106. The logical addresses in the logical address field 208, and the physical addresses indexed by the physical address index 202, provide a logical-to-physical (L2P) indirection table that the processor 102 can use to map the logical addresses to the physical addresses of the respective pages. The write cycle count field 210 includes values representing the numbers of write cycles that the respective pages have been subjected to at those physical addresses in the non-volatile memory. For example, the values in the write cycle count field 210 may range from zero to several tens or hundreds of thousands of write cycles, or, in some embodiments, up to one or more millions of write cycles. The physical address of a particular page is referred to herein as a "hot address" if the write cycle count for that page exceeds a specified threshold, e.g., 2.5 million write cycles, or any other suitable number of write cycles. If the write cycle count for a particular page does not exceed the specified threshold, then the physical address of that page is referred to herein as a "cold address".

In addition, the table 200 illustrates four representative data entries 212(1), 212(2), 212(3), 212(4) that can occupy four representative pages 1, 2, 3, 4, respectively, in the non-volatile memory of the non-volatile storage medium 106. The four data entries 212(1), 212(2), 212(3), 212(4) are indexed by four physical address indices 1, 2, 3, 4, respectively, of the physical address index 202. It is noted that the number of data entries shown in the table 200 is set forth herein for purposes of illustration, and that any other suitable number of data entries may be employed. Specifically, the data entry 212(1) occupying page 1 is indexed by the physical address index 1, the data entry 212(2) occupying page 2 is indexed by the physical address index 2, the data entry 212(3) occupying page 3 is indexed by the physical address index 3, and the data entry 212(4) occupying page 4 is indexed by the physical address index 4. Using the L2P indirection table provided by the table 200, the processor 102 can map logical address 1 in the logical address field 208 to the physical address indexed by physical address index 1 when performing data erase/write operations involving the data entry 212(1). Likewise, the processor 102 can map logical address 3 in the logical address field 208 to the physical address indexed by physical address index 2 when performing data erase/write operations involving the data entry 212(2), can map logical address 4 in the logical address field 208 to the physical address indexed by physical address index 3 when performing data erase/write operations involving the data entry 212(3), and can map logical address 2 in the logical address field 208 to the physical address indexed by physical address index 4 when performing data erase/write operations involving the data entry 212(4).

Figure 3:
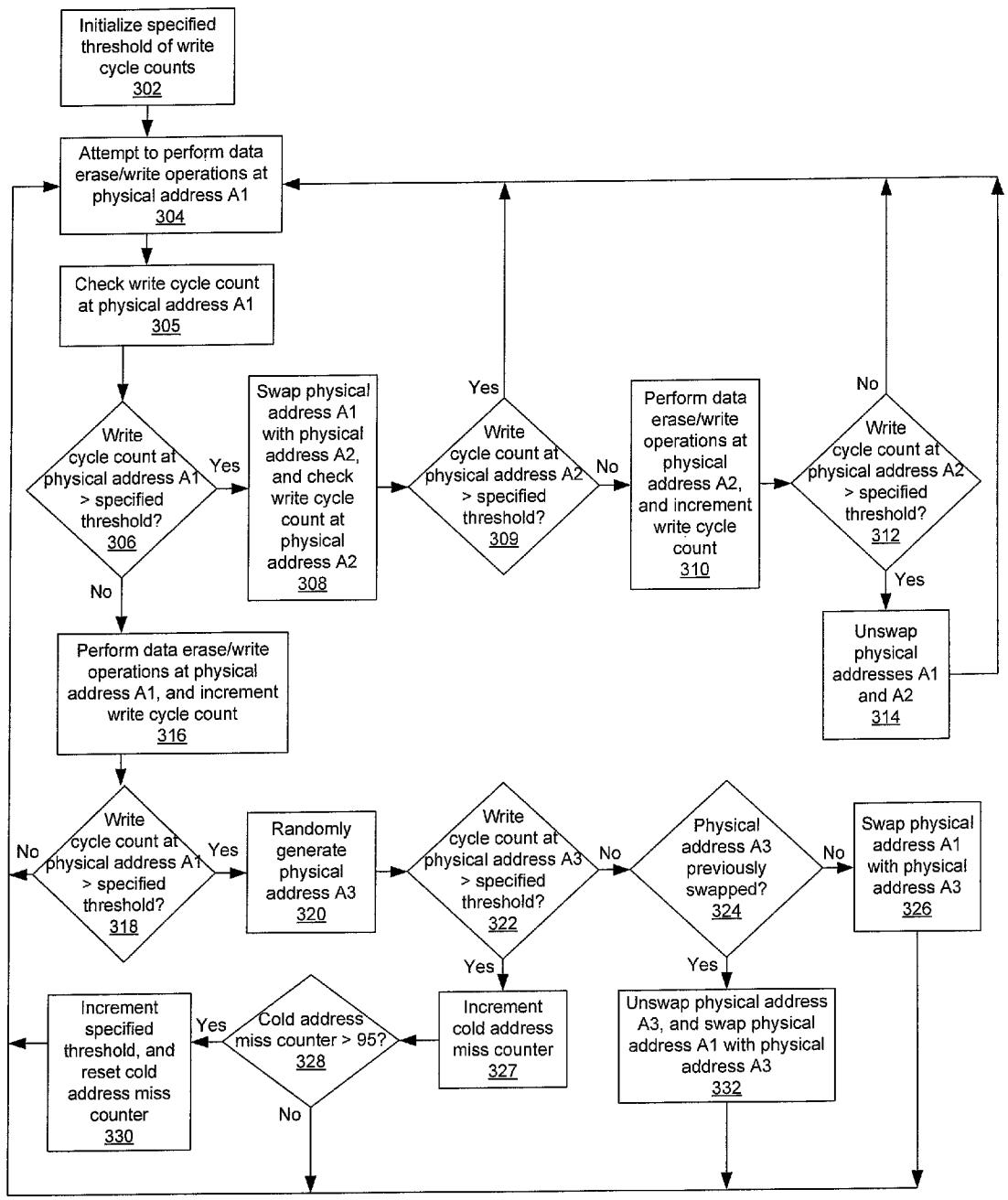
FIG. 3 illustrates a flow diagram of a method of memory cell wear management that can be employed in the computer system of FIG. 1.

The disclosed systems and methods of memory cell wear management are further described below with reference to the flow diagram illustrated in FIG. 3. Within the computer system 100, such memory cell wear management can be performed by the processor 102 executing instructions stored on the memory 104 for initiating a memory cell wear management process, and subsequently controlling the operations of the memory 104 and/or the non-volatile storage medium 106. As illustrated in block 302, the processor 102 first initializes the specified threshold of write cycle counts to 2.5 million write cycles, or any other suitable number of write cycles. The processor 102 then attempts to perform data erase/write operations on a page, or any other suitable portion or chunk of memory, having a physical address "A1" in the non-volatile memory of the non-volatile storage medium 106, as illustrated in block 304. Prior to actually performing the data erase/write operations on the page starting at the physical address A1, the processor 102 checks the write cycle count field of the page metadata to determine the number of write cycles the page has been subjected to at the physical address A1, as illustrated in block 305.

As illustrated in block 306, the processor 102 determines whether the write cycle count for the page starting at the physical address A1 exceeds the specified threshold of 2.5 million write cycles. If it is determined that the write cycle count for the page at the physical address A1 exceeds the specified threshold, then the physical address A1 is deemed to be a hot address. The processor 102 therefore swaps the physical address A1 deemed to be a hot address with a physical address "A2" of another page in the non-volatile memory of the non-volatile storage medium 106, as illustrated in block 308. For example, the physical address A2 may be randomly generated by the processor 102, or otherwise generated, specified, designated, identified, or provided in any other suitable fashion. Further, the physical addresses A1 and A2 may be swapped while maintaining the same logical addresses for the respective physical addresses, as specified in the L2P indirection table. As further illustrated in block 308, the processor 102 checks the write cycle count field of the page metadata to determine the number of write cycles that the other page has been subjected to at the physical address A2. As illustrated in block 309, the processor 102 determines whether the write cycle count for the page starting at the physical address A2 exceeds the specified threshold of 2.5 million write cycles. If it is determined that the write cycle count for the page at the physical address A2 exceeds the specified threshold, then the physical address A2 is also deemed to be a hot address, and the process loops back to block 304. Otherwise, the physical address A2 is deemed to be a cold address, and the processor 102 performs the required data erase/write operations on the page starting at the physical address A2, and increments the write cycle count for the page at the physical address A2, as illustrated in block 310.

As illustrated in block 312, the processor 102 determines, by checking the write cycle count field of the page metadata, whether the write cycle count for the page starting at the physical address A2 exceeds the specified threshold of 2.5 million write cycles. If it is determined that the write cycle count for the page at the physical address A2 exceeds the specified threshold, then the physical address A2 is now deemed to be a hot address. The processor 102 therefore unswaps the physical addresses A1 and A2, as illustrated in block 314, and the process loops back to block 304. Otherwise, if it is determined that the write cycle count for the page at the physical address A2 does not exceed the specified threshold, i.e., the physical address A2 is still deemed to be a cold address, then the process loops back to block 304 without unswapping the physical addresses A1 and A2.

At block 306, if it is determined that the write cycle count for the page starting at the physical address A1 does not exceed the specified threshold of 2.5 million write cycles, then the physical address A1 is deemed to be a cold address. The processor 102 therefore performs the required data erase/write operations on the page at the physical address A1, and increments the write cycle count for the page at the physical address A1, as illustrated in block 316. As illustrated in block 318, the processor 102 determines, by checking the write cycle count field of the page metadata, whether the write cycle count for the page at the physical address A1 exceeds the specified threshold. If it is determined that the write cycle count for the page at the physical address A1 does not exceed the specified threshold, i.e., the physical address A1 is still deemed to be a cold address, then the process loops back to block 304.

Otherwise, if it is determined that the write cycle count for the page starting at the physical address A1 exceeds the specified threshold of 2.5 million write cycles, then the physical address A1 is now deemed to be a hot address. The processor 102 therefore randomly generates another physical address "A3", as illustrated in block 320, and determines, by checking the write cycle count field of the page metadata, whether or not the write cycle count for the page starting at the physical address A3 exceeds the specified threshold, as illustrated in block 322. If it is determined that the write cycle count for the page at the physical address A3 does not exceed the specified threshold, i.e., the physical address A3 is determined to be a cold address, then the processor 102 determines whether or not the physical address A3 has previously been swapped with another physical address, as illustrated in block 324. For example, the processor can determine whether or not the physical address A3 has previously been swapped with another physical address by checking the L2P indirection table. If it is determined that the physical address A3 has not previously been swapped with another physical address, then the processor 102 swaps the physical address A1 with the physical address A3, as illustrated in block 326, and the process loops back to block 304. Otherwise, the processor 102 first unswaps the physical address A3 and the other physical address it had previously been swapped with, and swaps the physical address A1 with the physical address A3, as illustrated in block 332. The process then loops back to block 304.

At block 322, if it is determined that the write cycle count for the page starting at the physical address A3 exceeds the specified threshold of 2.5 million write cycles, then the attempt of the processor 102 to randomly generate a cold address is deemed to have been unsuccessful. As illustrated in block 327, the processor 102 therefore increments a counter, referred to herein as the "cold address miss counter", and, as illustrated in block 328, determines whether the value of the cold address miss counter exceeds a specified value of 95, or any other suitable counter value. If it is determined that the value of the cold address miss counter exceeds the specified value of 95, then the processor 102 increments the specified threshold of write cycle counts by any suitable amount, such as 100,000, and resets the cold address miss counter to zero, as illustrated in block 330. The process then loops back to block 304. Otherwise, if it is determined that the value of the cold address miss counter does not exceed the specified value of 95, then the process loops back to block 304 without incrementing the specified threshold or resetting the cold address miss counter. In this way, if a predetermined percentage (e.g., 95%) of attempts to randomly generate a cold address are deemed to be unsuccessful, i.e., each attempt to randomly generate a cold address results in the generation of another hot address, then the processor 102 can dynamically increment the specified threshold of write cycle counts by the predetermined amount (e.g., 100,000), thereby increasing the number of physical addresses in the non-volatile memory of the non-volatile storage medium 106 that may subsequently be determined by the processor 102 to be cold addresses.

By allowing the previously swapped pair of physical addresses A1, A2 to be unswapped if that pair of physical addresses A1, A2 both become hot addresses, as illustrated in block 314, the percentage of swapped physical addresses in a memory cell address space may be reduced, thereby making the disclosed systems and methods more favorable to use with non-volatile storage media that employ "write-in-place" data handling techniques. The percentage of swapped physical addresses in the memory cell address space may be further reduced by allowing the physical address A3 in the swapped state to be unswapped prior to being swapped with the physical address A1, as illustrated in block 332. In addition, by allowing the physical address A1 to be swapped with the physical address A2, as illustrated in block 308, and by further allowing the physical address A1 to be swapped with the physical address A3, as illustrated in blocks 326 and 332, based on the dynamically incrementing threshold of write cycle counts, a more uniform distribution of write cycles across the memory cell address space may be achieved.

Figure 4:
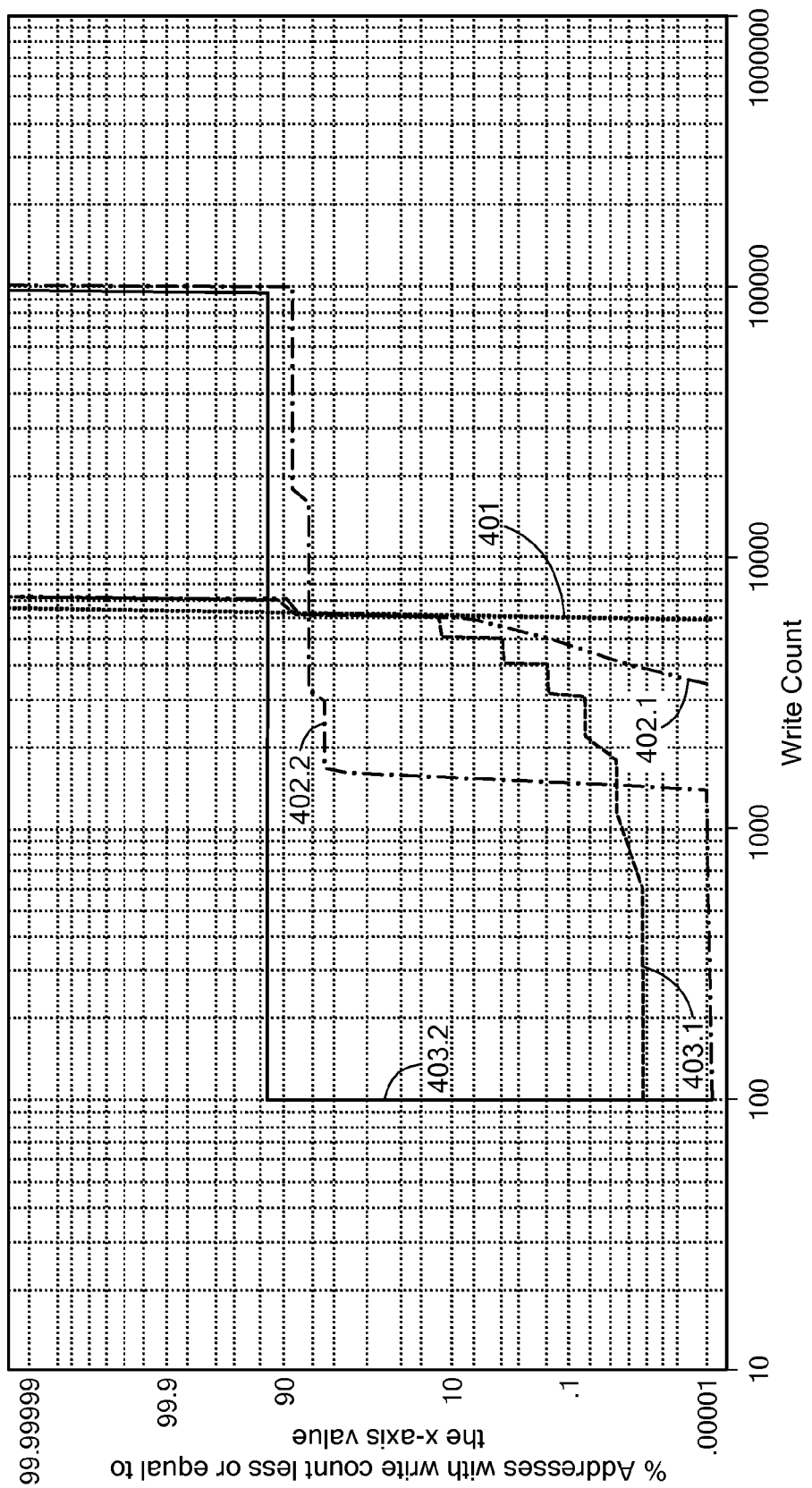
FIG. 4 illustrates a diagram of exemplary distributions of write cycles across a memory cell address space for a representative uniform workload, and two representative non-uniform workloads.

FIG. 4 illustrates a diagram of exemplary distributions of write cycles across a memory cell address space for a representative uniform workload, and two representative non-uniform workloads. In the representative uniform workload, it is assumed that any physical address in the memory cell address space can be erased/written to at random with uniform probability. The two representative non-uniform workloads include (1) a first non-uniform workload, in which it is assumed that 90% of the data erase/write operations are uniformly distributed on about 6% of the memory cell address space, and 10% of the data erase/write operations are uniformly distributed on about 94% of the memory cell address space, and (2) a second non-uniform workload, in which it is assumed that 100% of the data erase/write operations are uniformly distributed on about 6% of the memory cell address space, and no data erase/write operations are performed on the remaining memory cell address space.

For each of the representative uniform/non-uniform workloads, FIG. 4 illustrates an exemplary plot of the number of write cycle counts ("write count") versus the percentage of physical addresses in the memory cell address space ("% addresses"). A plot 401 for the representative uniform workload corresponds to the disclosed memory cell wear management process that employs a dynamically incrementing threshold of write cycle counts. Likewise, plots 402.1, 403.1 for the respective first and second representative non-uniform workloads correspond to the disclosed memory cell wear management process that employs the dynamically incrementing threshold of write cycle counts. Plots 402.2, 403.2 for the respective first and second representative non-uniform workloads correspond to a memory cell wear management process that employs a constant threshold of write cycle counts.

As illustrated in FIG. 4, the plot 401 corresponding to the representative uniform workload demonstrates that a generally uniform distribution of write cycles across the memory cell address space may be achieved using the disclosed memory cell wear management process with the dynamically incrementing threshold of write cycle counts. Further, a comparison of the plots 402.1, 402.2 for the first representative non-uniform workload demonstrates that a more uniform distribution of write cycles may be achieved using the disclosed memory cell wear management process with the dynamically incrementing threshold of write cycle counts. Likewise, a comparison of the plots 403.1, 403.2 corresponding to the second representative non-uniform workload demonstrates that a more uniform distribution of write cycles may be achieved using the disclosed memory cell wear management process with the dynamically incrementing threshold of write cycle counts.

Having described the above exemplary embodiments of the disclosed systems and methods of memory cell wear management, other alternative embodiments or variations may be made. For example, it was described herein that a physical address in a memory cell address space that is determined to be a hot address could be swapped with another physical address in the memory cell address space that is determined to be a cold address, based on a specified threshold of write cycle counts. It was also described herein that, if a physical address deemed to be a hot address is swapped with another physical address that subsequently transitions from being a cold address to a hot address, then that pair of physical addresses could be unswapped. In some embodiments, the disclosed systems and methods can also allow a physical address deemed to be a cold address to be swapped with another physical address deemed to be a hot address.

Moreover, the swapping of physical addresses in a memory cell address space can be based on more than one specified threshold of write cycle counts. For example, in addition to the specified threshold of write cycle counts described herein, a second threshold of write cycle counts may be specified in relation to a lower number of write cycle counts. Further, the physical address of a group of memory cells can be referred to as a "warm address" if the write cycle count for that group of memory cells exceeds the second specified threshold corresponding to the lower number of write cycle counts, but is less than the specified threshold corresponding to the higher number of write cycle counts. The swapping of physical addresses in the memory cell address space can therefore be based on whether the respective physical addresses are determined to be hot addresses, warm addresses, or cold addresses. It is noted that such swapping of hot addresses for cold addresses, cold addresses for hot addresses, warm addresses for cold addresses, cold addresses for warm addresses, hot addresses for warm addresses, and/or warm addresses for hot addresses, can be performed in various combinations and/or permutations to achieve more uniform distributions of write cycles across the memory cell address space, particularly in the case of non-uniform workloads.

It was also described herein that the disclosed systems and methods allow the physical addresses of memory cells that have been subjected to a high number of write cycles to be swapped with the physical addresses of memory cells that have been subjected to a lower number of write cycles. In some embodiments, the physical addresses of memory cells that have been subjected to a high number of read cycles can be swapped with the physical addresses of memory cells that have been subjected to a lower number of read cycles. In this case, the physical address of a group of memory cells may be referred to as a "hot address" if the number of read cycles (e.g., the "read cycle count") for that group of memory cells exceeds a specified threshold. Further, if the read cycle count for a group of memory cells does not exceed the specified threshold, then the physical address of that group of memory cells may be referred to as a "cold address". The physical address of a group of memory cells may also be referred to as a "warm address" based on more than one specified threshold of read cycle counts.

It was also described herein that the processor 102 can use an L2P indirection table to map logical addresses to physical addresses. In some embodiments, the L2P indirection table may be stored in a centralized location within the computer system 100, such as in the volatile memory 112. It is noted that information relating to the L2P indirection table stored in the volatile memory 112 may be lost if power is removed from the computer system 100. In other embodiments, the L2P indirection table may be stored in the non-volatile storage medium 106. In still other embodiments, elements of the L2P indirection table may be distributed within and/or between one or more of the various components of the computer system 100.

Figure 5:
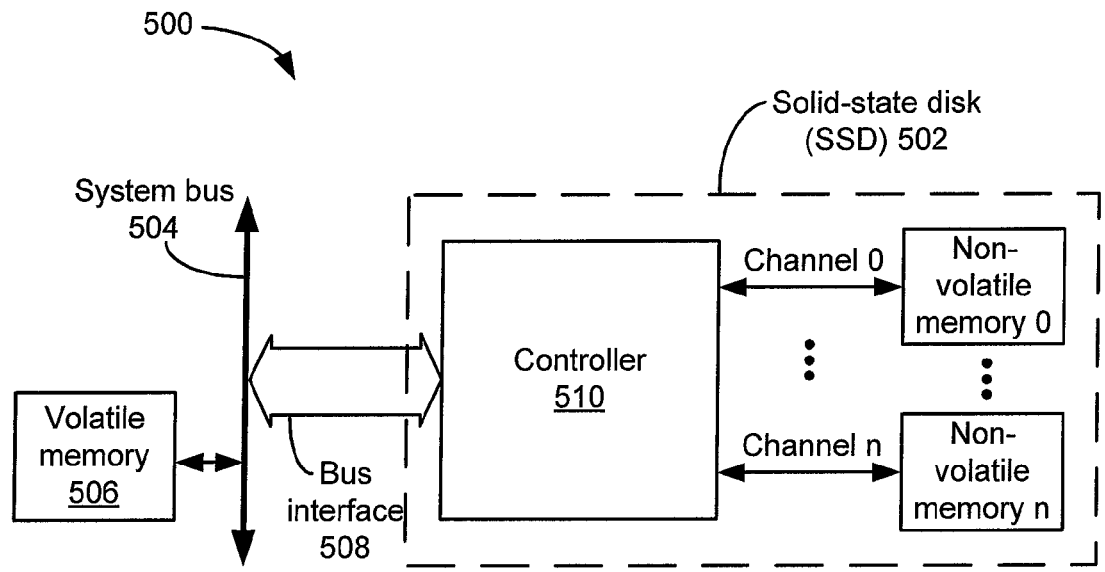
FIG. 5 illustrates a block diagram of a solid-state disk (SSD) that can be configured to implement memory cell wear management.

It was also described herein that the computer system 100 includes the processor 102, the memory 104, and the non-volatile storage medium 106, which can be implemented as a solid-state disk (SSD). FIG. 5 illustrates a computing system or device 500 that includes an SSD 502. As shown in FIG. 5, the computing system or device 500 further includes a system bus 504, and a volatile memory 506 connected to the system bus 504. The SSD 502 includes a controller 510 and a plurality of non-volatile memories 0 through n, which are connected to the controller 510 by a plurality of channels 0 through n, respectively. The controller 510 is connectable to the system bus 504 by a bus interface 508. Within the SSD 502, the controller 510 can be configured to perform the disclosed methods of memory cell wear management for achieving a more uniform distribution of write cycles across a memory cell address space defined by one or more of the non-volatile memories 0 through n.

Figure 6:
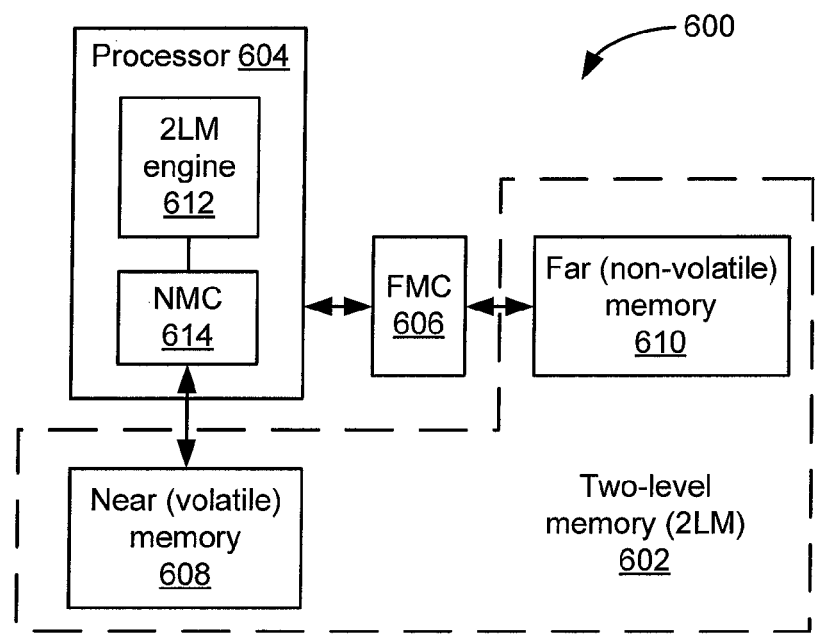
FIG. 6 illustrates a block diagram of a two-level memory (2LM) that can be configured to implement memory cell wear management.

FIG. 6 illustrates a computing system or device 600 that includes a two-level memory (2LM) 602, which, in turn, includes a near (volatile) memory 608 and a far (non-volatile) memory 610. As shown in FIG. 6, the computing system or device 600 further includes a processor 604 and a far memory controller (FMC) 606. The processor 604 includes a 2LM engine 612 and a near memory controller (NMC) 614. The NMC 614 manages the operation of the near (volatile) memory 608, which can function as a cache of the far (non-volatile) memory 610. For example, the near (volatile) memory 608 may be implemented as a dynamic random access memory (DRAM), or any other suitable volatile memory. The FMC 606 manages the operation of the far (non-volatile) memory 610, which may be implemented as a flash memory or any other suitable non-volatile memory. Within the computing system or device 600, the 2LM engine 612 can be configured to support the operations of the 2LM 602, including operations for performing the disclosed methods of memory cell wear management for achieving a more uniform distribution of write cycles across a memory cell address space defined by the far (non-volatile) memory 610.

The foregoing description of exemplary embodiments is provided for purposes of illustration, and is not intended to be exhaustive or to limit the application to the precise form disclosed. Modifications and variations are possible in light of the teachings herein, or may be acquired from practice of the claimed invention. For example, while a series of operations has been described herein with reference to FIG. 3, the order of the operations may be modified in other implementations. Further, non-dependent operations may be performed in parallel.

In addition, the term "user", as employed herein, is intended to be broadly interpreted to include, for example, a computing device (e.g., a fixed computing device, a mobile computing device) or a user of a computing device, unless otherwise stated.

It will be apparent that one or more embodiments described herein may be implemented in many different forms of software and/or hardware. Software code and/or specialized hardware used to implement embodiments described herein is not limiting of the claimed invention. Thus, the operation and behavior of embodiments were described herein without reference to the specific software code and/or the specialized hardware, it being understood that one of ordinary skill in the art would be able to design software and/or hardware to implement the embodiments based on the description herein.

Further, certain features of the claimed invention may be implemented using computer-executable instructions that may be executed by a processor or processing logic, such as the processor 102. The computer-executable instructions may be stored on one or more non-transitory tangible computer-readable storage media, which may be volatile or non-volatile, and may include, but are not limited to, DRAM, static random access memory (SRAM), flash memories, removable disks, and/or non-removable disks.

No element, operation, or instruction employed herein should be construed as critical or essential to the application unless explicitly described as such. Also, as employed herein, the article "a" is intended to include one or more items. Where only one item is intended, the term "one" or similar language is employed. Further, the phrase "based on" is intended to mean "based, at least in part, on" unless explicitly stated otherwise.

It is intended that the invention not be limited to the particular embodiments disclosed herein, but that the invention will include any and all particular embodiments and equivalents falling within the scope of the following appended claims.

What is claimed is:

1. A method of performing memory cell wear management in a computer system that employs a near memory and a far memory, comprising:
   keeping track of a first number of write cycles that a first memory portion of the far memory has been subjected to, the first memory portion having a first physical memory address;
   in response to the first number of write cycles for the first memory portion having exceeded a first specified threshold, swapping the first physical memory address with a second physical memory address, the second physical memory address corresponding to a second memory portion of the far memory that has been subjected to a second number of write cycles below the first specified threshold;
   performing a data write operation on the second memory portion having the second physical memory address; and
   in response to a predetermined event, incrementing the first specified threshold by a predetermined amount.

2. The method of claim 1 further comprising:
   randomly generating the second physical memory address.

3. The method of claim 2 wherein the randomly generating of the second physical memory address includes randomly generating one or more physical memory addresses until the second physical memory address corresponding to the second memory portion that has been subjected to the number of write cycles below the first specified threshold is generated.

4. The method of claim 3 wherein the predetermined event corresponds to randomly generating more than a specified number of physical memory addresses, and wherein the incrementing of the first specified threshold includes incrementing the first specified threshold by the predetermined amount in the event more than the specified number of physical memory addresses have been randomly generated.

5. The method of claim 1 further comprising:
   determining that the second memory portion having the second physical memory address has been subjected to a third number of write cycles that exceeds the first specified threshold; and
   unswapping the first physical memory address and the second physical memory address.

6. The method of claim 1 further comprising:
   determining that the second physical memory address has been previously swapped with another physical memory address; and
   unswapping the second physical memory address and the other physical memory address prior to the swapping of the first physical memory address with the second physical memory address.

7. The method of claim 1 further comprising:
   determining that the first memory portion having the first physical memory address has been subjected to a third number of write cycles that exceeds a second specified threshold.

8. The method of claim 7 further comprising:
   determining that the second memory portion has been subjected to the second number of write cycles that is below one or both of the first specified threshold and the second specified threshold.

9. The method of claim 8 wherein the incrementing of the first specified threshold by the predetermined amount includes incrementing one or both of the first specified threshold and the second specified threshold by the predetermined amount.

10. The method of claim 1 wherein the near memory comprises a volatile memory, and the far memory comprises a non-volatile memory.

11. The method of claim 1 wherein the near memory comprises a dynamic random access memory (DRAM), and the far memory comprises one or more of (1) NAND or NOR flash memory that uses a single bit per memory cell, (2) multi-level cell (MLC) memory, (3) NAND flash memory with two bits per cell, (4) polymer memory, (5) phase-change memory (PCM), (6) stacked PCM cell arrays that use phase-change memory and switch (PCMS) technology, (7) nanowire-based charge-trapping memory, (8) ferroelectric transistor random access memory (FeTRAM), and (9) 3-dimensional cross-point memory.

12. An apparatus for performing memory cell wear management, comprising:
   a near memory and a far memory, the far memory including at least a first memory portion having a first physical memory address, and a second memory portion having a second physical memory address; and
   at least one controller operative:
      to keep track of a first number of write cycles that the first memory portion has been subjected to;
      in response to the first number of write cycles for the first memory portion having exceeded a first specified threshold, to swap the first physical memory address with the second physical memory address prior to performing a data write operation on the second memory portion, the second memory portion having been subjected to a second number of write cycles below the first specified threshold; and
      in response to a predetermined event, to increment the specified threshold by a predetermined amount.

13. The apparatus of claim 12 wherein the at least one controller is further operative to randomly generate the second physical memory address.

14. The apparatus of claim 13 wherein the at least one controller is further operative to randomly generate one or more physical memory addresses until the second physical memory address corresponding to the second memory portion that has been subjected to the number of write cycles below the specified threshold is generated.

15. The apparatus of claim 14 wherein the predetermined event corresponds to randomly generating more than a specified number of physical memory addresses, and wherein the at least one controller is further operative to increment the specified threshold by the predetermined amount in the event more than the specified number of physical memory addresses have been randomly generated.

16. The apparatus of claim 12 wherein the at least one controller is further operative:
to determine that the second memory portion having the second physical memory address has been subjected to a third number of write cycles that exceeds the specified threshold; and
to unswap the first physical memory address and the second physical memory address.

17. The apparatus of claim 12 further comprising:
a processor communicatively coupled to the at least one controller.

18. The apparatus of claim 12 wherein the near memory comprises a volatile memory, and the far memory comprises a non-volatile memory.

19. The apparatus of claim 12 wherein the near memory comprises a dynamic random access memory (DRAM), and the far memory comprises one or more of (1) NAND or NOR flash memory that uses a single bit per memory cell, (2) multi-level cell (MLC) memory, (3) NAND flash memory with two bits per cell, (4) polymer memory, (5) phase-change memory (PCM), (6) stacked PCM cell arrays that use phase-change memory and switch (PCMS) technology, (7) nanowire-based charge-trapping memory, (8) ferroelectric transistor random access memory (FeTRAM), and (9) 3-dimensional cross-point memory.

20. A method of performing memory cell wear management in a computer system that employs a near memory and a far memory, comprising:
keeping track of one or both of a first number of write cycles and a first number of read cycles that a first memory portion of the far memory has been subjected to, the first memory portion having a first physical memory address;
in response to one or both of the first number of write cycles and the first number of read cycles for the first memory portion having exceeded a first specified threshold, swapping the first physical memory address with a second physical memory address, the second physical memory address corresponding to a second memory portion of the far memory that has been subjected to one or both of a second number of write cycles and a second number of read cycles below the first specified threshold;
performing a data write operation on the second memory portion having the second physical memory address; and
in response to a predetermined event, incrementing the specified threshold by a predetermined amount.

21. The method of claim 20 further comprising:
randomly generating the second physical memory address.

22. The method of claim 21 wherein the randomly generating of the second physical memory address includes randomly generating one or more physical memory addresses until the second physical memory address corresponding to the second memory portion that has been subjected to the number of read cycles below the specified threshold is generated.

23. The method of claim 22 wherein the predetermined event corresponds to randomly generating more than a specified number of physical memory addresses, and wherein the incrementing of the specified threshold includes incrementing the specified threshold by the predetermined amount in the event more than the specified number of physical memory addresses have been randomly generated.

24. The method of claim 20 wherein the near memory comprises a volatile memory, and the far memory comprises a non-volatile memory.

25. The method of claim 20 wherein the near memory comprises a dynamic random access memory (DRAM), and the far memory comprises one or more of (1) NAND or NOR flash memory that uses a single bit per memory cell, (2) multi-level cell (MLC) memory, (3) NAND flash memory with two bits per cell, (4) polymer memory, (5) phase-change memory (PCM), (6) stacked PCM cell arrays that use phase-change memory and switch (PCMS) technology, (7) nanowire-based charge-trapping memory, (8) ferroelectric transistor random access memory (FeTRAM), and (9) 3-dimensional cross-point memory.

* * * * *